United States Patent

[11] 3,568,569

| [72] | Inventor | Wilburn K. Haley<br>Warren, Mich. |
|---|---|---|
| [21] | Appl. No. | 804,571 |
| [22] | Filed | Mar. 5, 1969 |
| [45] | Patented | Mar. 9, 1971 |
| [73] | Assignee | The Babcock & Wilcox Company<br>New York, N.Y. |

[54] DRIVES FOR BROACHING MACHINES AND THE LIKE
11 Claims, 4 Drawing Figs.

[52] U.S. Cl. .................................................. 90/78,
74/242.14, 144/245, 198/232, 90/21
[51] Int. Cl. ..................................................... B23d 37/06,
B65g 43/02

[50] Field of Search. ........................................... 90/78, 86,
79, 21, 21.02, 11, 24, 21; 144/245.1, 245—1.5,
242—4; 51/76; 74/242.14; 198/40, 203, 232;
83/(Inquired)

[56] References Cited
UNITED STATES PATENTS

| 2,540,058 | 1/1951 | Stern ........................... | 90/78X |
| 2,785,793 | 3/1957 | Murphy et al. ............... | 198/232 |
| 3,463,024 | 8/1969 | Blanshine et al. ............. | 74/242.14X |

Primary Examiner—Gil Weidenfeld
Attorney—Barnes, Kisselle, Raisch and Choate

ABSTRACT: A broaching machine having a chain drive in which the chain is trained over idler sprockets that are yieldingly mounted to tension the chain by means of grease filled cylinders.

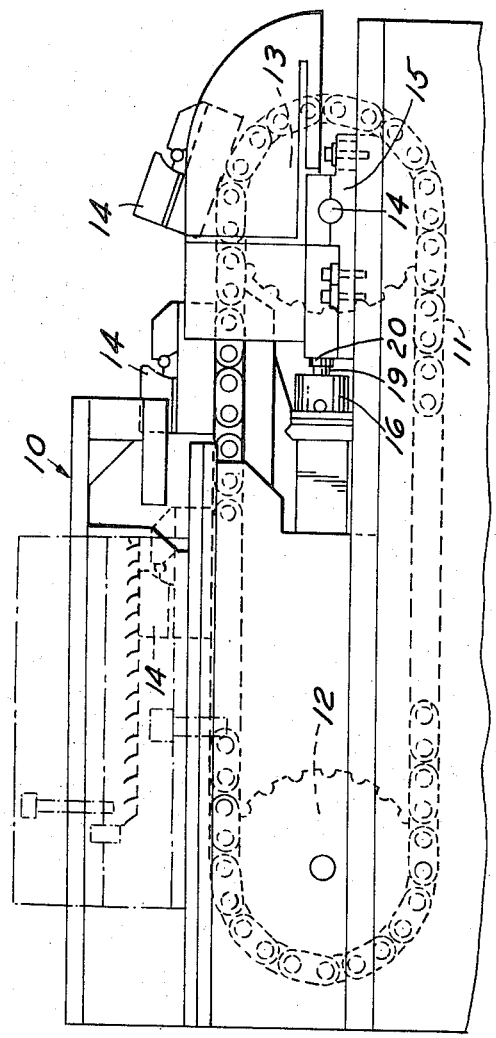
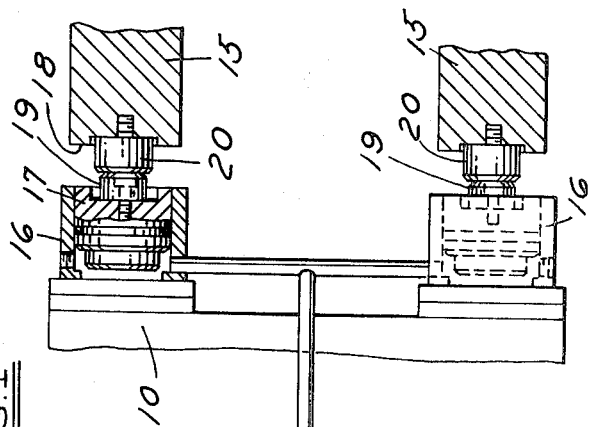
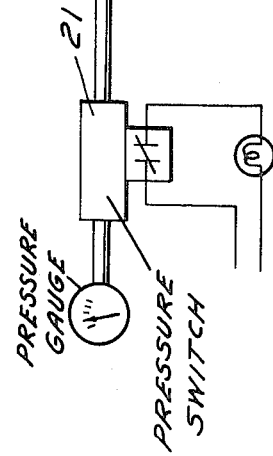
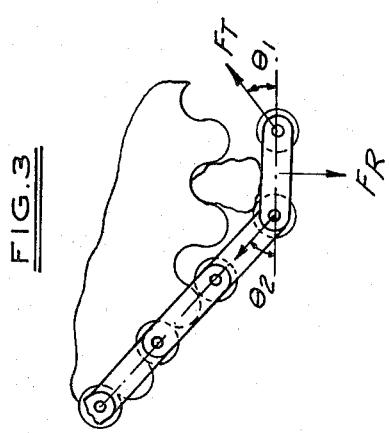
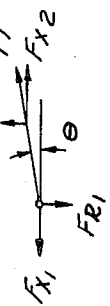
INVENTOR
WILBURN K. HALEY
BY
Barnes, Kisselle, Raisch & Choate
ATTORNEYS

3,568,569

DRIVES FOR BROACHING MACHINES AND THE LIKE

BACKGROUND OF THE INVENTION

In drives such as chain drives generally and in continuous (or tunnel) broaching machines in particular, in which work holding pallets are propelled by chains so as to drive the parts across the broaching tools, the problem of overloads is a serious one. Consider the situation where chains are driven by drive sprockets at the one end of the machine and are trained over idler sprockets at the other end of the machine. In order to obtain smooth operation and, avoid shocks as sections of chain are taken up, it is necessary to apply a pretension force. Since the drive end of the machine is, so to speak, fully occupied, the pretensioning must be done from the idler end. This is usually done by affixing a bracket rigidly to the machine frame on each side and using a screw adjustment, like a turnbuckle but in compression rather than tension, to apply tension to the chain. The chain tension is balanced against the screw's compression to provide a stable system. Such preload arrangements are common to all chain drives and belt drives.

The trouble with such a preload system as that described above is that it is not very flexible. If something goes wrong in the chain, there is nothing that can be done about it. In particular, in broaching machines in which small parts are being produced, it is very common for the operator to drop a part out of the fixture into the interior of the frame. The parts are dragged by the lower section of chain into the idler sprocket, after which they are caught between the chain and the sprocket, one of which then breaks.

Attempts have been made to use springs to set the preload, but such springs are so heavy as to be a poor solution and are in addition, very dangerous to use. The usual preload is so high that the spring is bulkier than the rest of the equipment, and has so high a spring rate (pounds of load per inch of movement) that the available deflection under overload is not large enough to save the situation before something breaks.

Among the objects of the invention are to provide an endless drive such as a chain drive wherein any overload will be sensed and the drive will be interrupted without damage; to provide such a drive in combination with a broaching machine; to provide such a drive which is relatively simple to maintain and will effectively function without substantial maintenance.

SUMMARY OF THE INVENTION

In accordance with the invention, the broaching machine has a chain drive in which the chain is trained over idler sprockets that are yieldingly mounted to tension the chain by means of grease filled cylinders.

In the drawings:

FIG. 1 is a fragmentary side elevational view of a broaching machine embodying the invention.

FIG. 2 is a partly diagrammatic sectional plan view of a portion of the machine shown in FIG. 1.

FIG. 3 is a fragmentary partly diagrammatic view showing the manner in which the forces act on a portion of the apparatus.

FIG. 4 is a free-body diagram of the forces on the portion of the apparatus shown in FIG. 3.

DESCRIPTION

Referring to FIG. 1, the invention is shown in connection with a broaching machine 10 which is of a conventional variety and includes a pair of endless chains 11 trained over spaced drive sprockets 12 and spaced idler sprockets 13. The chain supports pallet 14 which moves the workpiece past the tools of the broaching machine.

Idler sprockets 13 are mounted on a shaft 14 journaled on pillow blocks 15. A pair of appropriately sized cylinders 16 are mounted on base 10. These cylinders 16 are carefully bored and sealed so that very little leakage takes place even at quite high pressures, and they are filled with a reasonably heavy grease, used as a fluid medium. The shafts 17 of cylinders 16 and idler sprocket brackets 18 are provided with hardened wear pads 19, 20 (FIG. 2) and the cylinders are rear mounted, rigidly, so that the wear points of bracket & cylinder meet on each side. The cylinders 16 are connected in parallel, hydraulically (see FIG. 2), and arrangements for filling, bleeding air from the system through valve 22, and visual and electrical monitoring are provided. It is quite important to get air out of the system because air, being compressible, serves as an accumulator and slows down the system response.

In operation, the cylinders are charged to a nominal value, for example, about 1000 p.s.i., and a pressure switch is set to operate at a higher pressure such as 1500 p.s.i. These values are experimentally determined, and derive from the cylinder size chosen and the manufacturer's statement of safe and excessive loads for the chain. In normal operation the chain leaves the tension side and enters the return side fairly accurately tangent to the pitch line of the idler sprocket and horizontal (that is, toward the mating pitch line of the drive sprocket).

Now, assume that a part falls to the bottom of the tunnel, past the fixturing and down onto the chain. It is, as was noted above, going to be dragged up into the return side (the lower pitch line) of the idler sprocket. Now, the pretension cylinders 16 must be set to such a level that the tension in the idler chain is greater than zero, otherwise the chain will drag and eventually result in difficulties. Therefore, as soon as the part comes between the chain and the sprocket, a force is generated which increases the chain tension and so the load on the pretension cylinder, which cannot avoid changing pressure to balance the chain pulls. The force relations are as shown in FIG. 3.

Let $F_R$ be the force of compression on chain and sprocket. Now, let us take the section of chain as a free body from the point at which the obstruction is located to the right, down the chain (FIG. 4). Since vertical forces must balance, and the left hand force has only a downward component (due to the compression force on the sprocket), we may say: $F_{R_1} = F_{R_2} = F_T \sin \Theta$.

That is, the compressive force is equal to the chain tension X the sine of the angle of the chain from the horizontal due to the obstruction. That is, the chain tension, $$F_T = \frac{F_{R_1}}{\sin \theta}$$

Now the angle $\Theta$ is a very small one, and its sine is a small number. It would not be surprising if the chain tension increase is ten times the compressive force. Since the pretension cylinder pressure is directly proportional to chain tension, it is easy to see that this pressure will increase enough to throw the safety pressure switch 21 which controls the motor driving the driver sprockets 12 well before any damage results to sprocket or chain, because of the geometry of the situation.

The system thus allows the chain drive (it would work equally well with a belt drive) to operate under conditions of gross interference at the sprocket with adequate protection against overload; something that is not now available. An incidental advantage is that direct monitoring of pretension force is available with this system, which is not the case with the usual screw adjustments.

I claim:

1. In a broaching machine, the combination comprising:
   a workpiece support;
   a broaching tool;
   flexible endless conveyor means for moving said workpiece support relative to said broaching tool;
   said last-mentioned means comprising at least one rotary drive member engaging said endless support means and at least one rotary idler member over which said support means is trained;
   means for supporting said idler member for relative movement with respect to said drive member;

fluid operated means yieldingly urging said idler means in a direction to place said endless conveyor means under tension; and means responsive to a predetermined pressure in said fluid operated means to create a signal.

2. The combination set forth in claim 1 wherein said fluid operated means comprises a cylinder having a cylinder housing and a piston, one of said cylinder and said piston being fixed and the other being operatively connected to said idler member.

3. The combination set forth in claim 2 wherein said cylinder includes a fluid which is sealed within said cylinder.

4. The combination set forth in claim 3 including means for varying the pressure of the fluid in the cylinder.

5. The combination set forth in claim 3 wherein said fluid is of the incompressible type.

6. The combination set forth in claim 5 wherein said incompressible-type fluid comprises a grease.

7. The combination set forth in claim 1 including means responsive to said signal for interrupting the drive to said drive member.

8. The combination set forth in claim 1 wherein said endless conveyor means comprises a chain, said drive and idler members comprising sprockets.

9. The combination set forth in claim 8 wherein said fluid operated means comprises a cylinder assembly including a cylinder housing a piston, said piston having a piston shaft engaging said means for supporting said idler member.

10. The combination set forth in claim 9 including hardened interengaging portions between said piston shaft and said means for supporting said idler member.

11. The combination set forth in claim 1 wherein said fluid operated means comprises a pair of cylinder assemblies, said idler member including a shaft, and spaced portions of said shaft being engaged with the pistons of said cylinders.